Nov. 7, 1967  R. W. BUSHMEYER  3,351,138
TRIP MECHANISM FOR PLOW BOTTOM
Filed Sept. 16, 1965  3 Sheets-Sheet 3
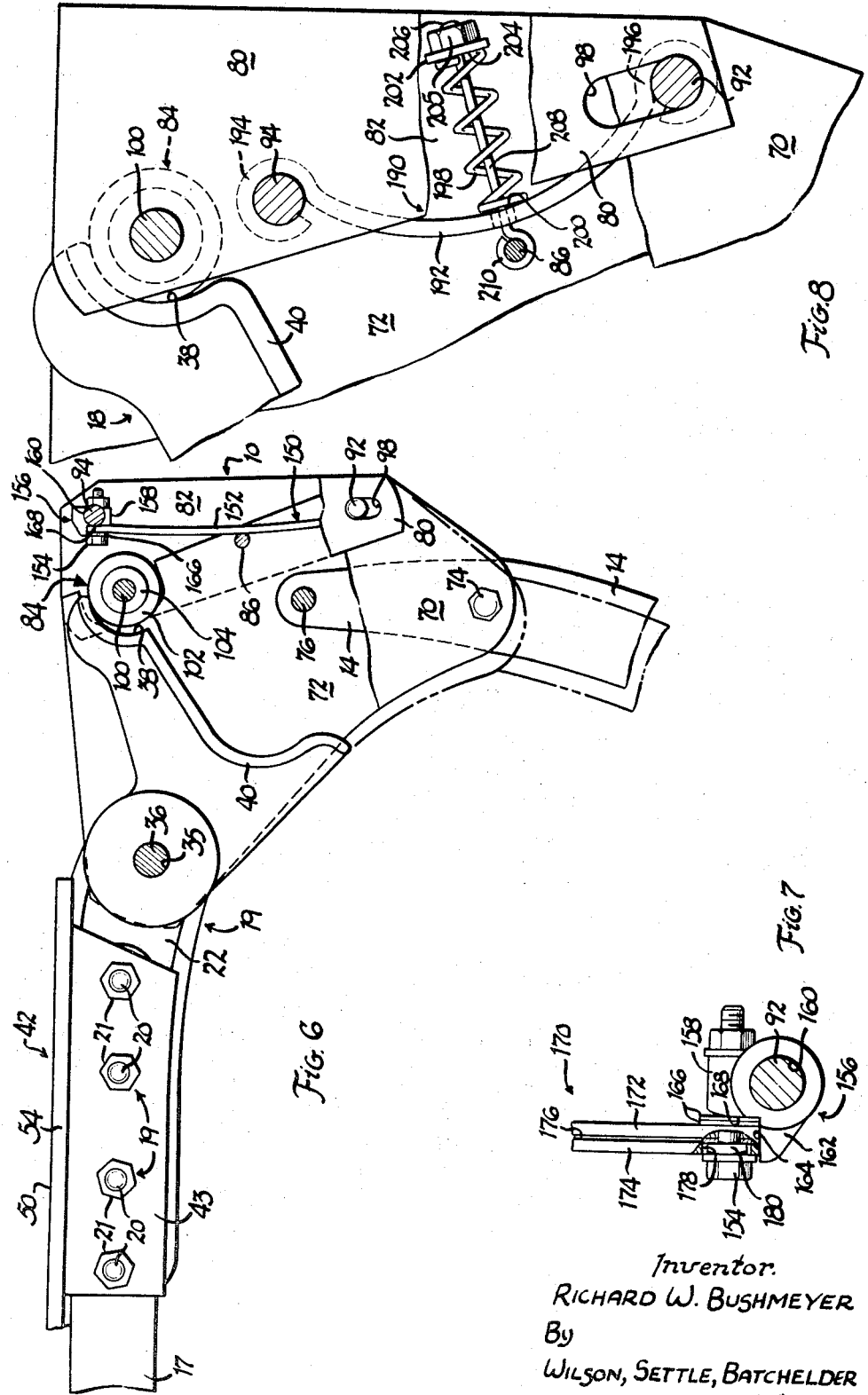
Inventor.
RICHARD W. BUSHMEYER
By
WILSON, SETTLE, BATCHELDER
ATT'YS.  &CRAIG

United States Patent Office 3,351,138
Patented Nov. 7, 1967

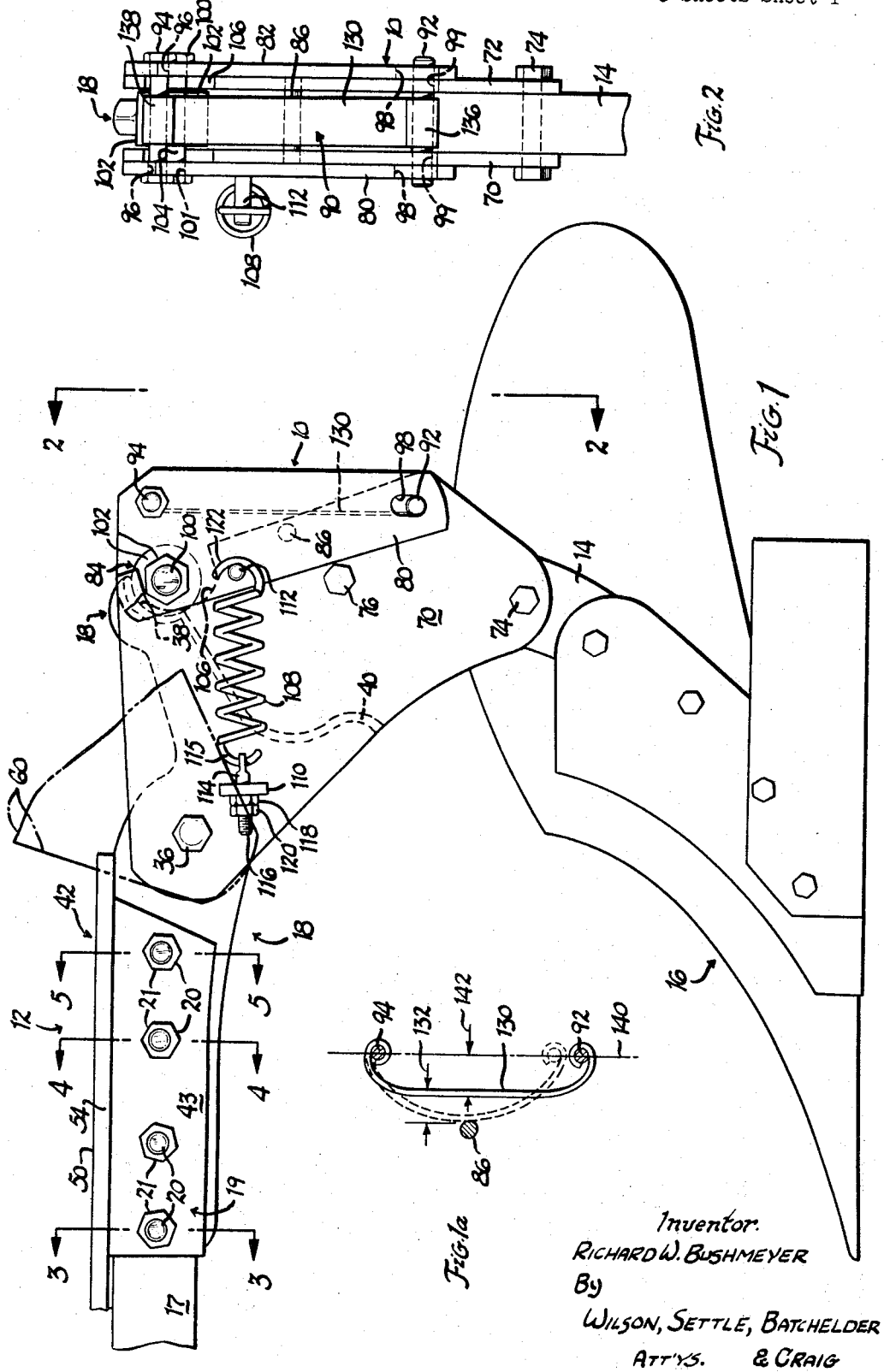

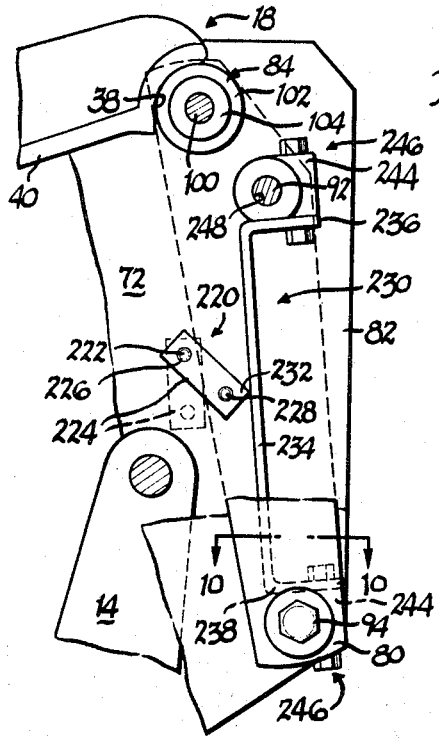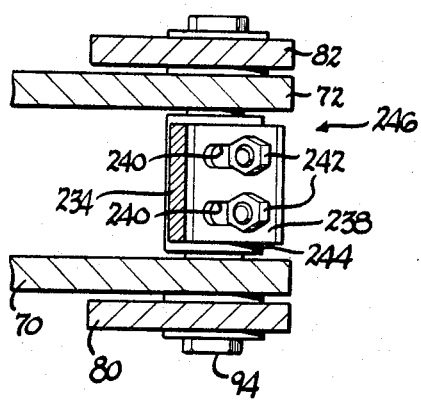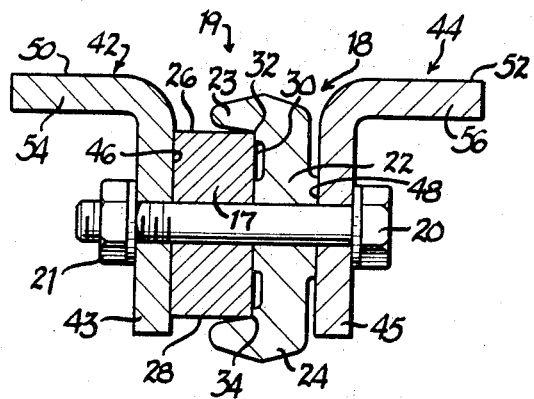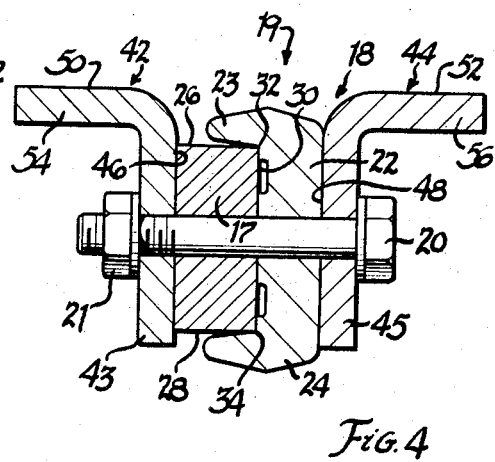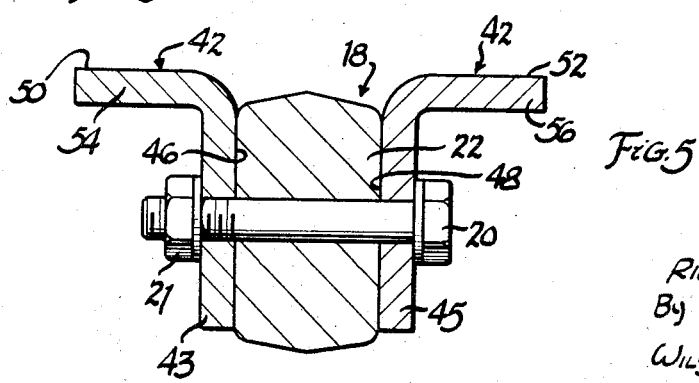

3,351,138
TRIP MECHANISM FOR PLOW BOTTOM
Richard W. Bushmeyer, Rockford, Ill., assignor to J. I. Case Company, Racine, Wis., a corporation of Wisconsin
Filed Sept. 16, 1965, Ser. No. 487,730
8 Claims. (Cl. 172—269)

ABSTRACT OF THE DISCLOSURE

A plow having a main beam and a plow standard with trip mechanism interposed therebetween. The trip mechanism has a limited yield which allows relative movement between the beam and standard without fully tripping the standard from its working position to its idle position. The trip mechanism is adjustable to vary the magnitude of force required to completely trip the mechanism and is designed so that a very minimal amount of spring force is required to maintain the trip mechanism in operative condition. The plow also includes a laminated beam extension capable of resisting the bending moment and shear stresses during plowing.

---

The present invention relates generally to improvements in trip mechanisms for earth-working tools, such as break-back plows.

Attempts to prevent damage to earth-working tools, such as plow bottoms, caused by the tool striking an earthbound obstruction, date from almost the inception of man's tillage of the soil. Efforts to cushion or reduce impact load imposed on tillage equipment have continued up to the present time. However, even recent solutions to this problem are, or may be rendered obsolete by subsequent improvements in tractor speed and horsepower. Consequently, each improvement in tractors almost inherently necessitates further search for more effective solutions to prevent impact damage to earth-working tools caused by obstructions hidden in the soil.

In order to adequately cushion or reduce impact load imposed on tillage equipment, many of the more recent prior art release or break-back mechanisms have used a linkage comprising a series of pivotally interconnected lever-links, for example see United States Letters Patent No. 3,125,167. While such release mechanisms having in the past adequately absorbed impact shock loads, they inherently possess certain objectionable features. Among these are: (1) a high initial cost to manufacture and assemble the relatively large number of components; (2) the presence of looseness in the linkage due to tolerance build-up in the large number of lever-links and pivot pins and also due to wear; (3) erratic tripping or release at forces of different magnitudes for the same linkage setting, making the release mechanism unpredictable and often increasing the number of full trip displacements of the tool thereby requiring more time to till a unit area of land; (4) difficulty experienced in endeavoring to adjustably vary, with adequate precision, the resistance afforded by the release mechanism to full tripping action; (5) partial tripping of the tool often alters the pitch of the tool with respect to the ground thereby undesirably modifying the tool's earth-working characteristics; and (6) relatively large restraining springs and/or excessive friction have been required to adequately resist a high trip plowing force.

Accordingly, it is an object of the present invention to provide a simplified trip mechanism for an earth-working tool of the break-back type having a dependable constant tripping action.

Another object is to provide a trip mechanism for an earth-working tool which will (1) yieldingly resist full tripping action by the plow thereby reducing the number of times the tool is fully tripped from its working position to its idle position and (2) accommodate smooth transition between the working and idle positions precisely at a point in time when the plowing force exerted upon the eccentric column reaches a predetermined magnitude.

Another object of this invention is to provide a trip mechanism for an earth-working tool which has one or more of the following features: (1) provision of a tripping mechanism which is readily adjustable to vary the resistance of the release mechanism to tool displacement; (2) provision of a tripping mechanism which accommodates full, smooth tripping of the tool to the idle position precisely in response to a tripping force of predetermined magnitude, thereby avoiding erratic tripping; (3) wherein partial tripping of the tool will not materially alter the pitch of the tool with respect to the ground and, thus will not undesirably modify the earth-working characteristics of the tool, and (4) wherein a relatively light weight release mechanism is capable of resisting a relatively high tripping force.

These and other objects and features of the present invention will become more fully apparent from the following description and appended claims taken in conjunction with the accompanying drawings wherein:

FIGURE 1 is a side elevation of one embodiment of the present invention equipped with an eccentric column of fixed eccentricity;

FIGURE 1a is a schematic diagram of the column of FIGURE 1;

FIGURE 2 is a rear elevation taken along line 2—2 of FIGURE 1;

FIGURES 3, 4 and 5 are cross sectional views taken respectively along lines 3—3, 4—4, and 5—5 of FIGURE 1;

FIGURE 6 is a side elevation of another form of apparatus equipped with an eccentric column of selectively variable eccentricity, the left side link and the left gusset plate being broken away for the purpose of better illustrating the details of the release mechanism including the eccentric column;

FIGURE 7 is a fragmentary side elevation, with parts broken away for clarity of illustration, of a multi-leaf eccentric column of selectively variable eccentricity useable with the present invention;

FIGURE 8 is a fragmentary side elevation view of still another embodiment of the present invention with parts broken away for clarity, the release mechanism utilizing an eccentric leaf spring column having an initial preformed severe camber;

FIGURE 9 is a fragmentary side elevation of still another embodiment of the present invention, the eccentric column thereof being provided with slotted offset ends for varying the eccentricity of the column, and FIGURE 10 is a cross sectional view in plan taken along line 10—10 of FIGURE 9.

Referring to the drawings wherein like numerals are used to designate like parts throughout, FIGURE 1 shows one form of trip mechanism of the present invention, generally designated 10, in its normal operating position on a break-back plow. Trip mechanism 10 is interposed between a substantially horizontally extending rigid plow support, generally designated 12, and a plow standard 14 to which a plow bottom 16 is rigidly attached, as for example, by bolts.

The rigid support 12 comprises a plow beam 17 and a forged plow beam extension 18. The plow beam extension 18, as best illustrated in FIGURES 1, 3, 4 and 5, is rigidly joined to the plow beam 17 by a laminated connection 19 to afford optimum, unitary resistance to the bending moment stresses, the shear stresses, and the torsional stresses transmitted thereto by action of the plow against the soil.

Plow beam extension 18 has a central body 22 at its forward end from which upper and lower integral flanges 23, and 24, respectively, project essentially horizontally toward the plow beam 17. The flanges 23 and 24 respectively engage the upper surface 26, lower surface 28 and the side surface 30 of the plow beam 17 at angular recesses 32 and 34 of the plow beam extension 18, as depicted in FIGURES 3 and 4. By the action of the flanges 23 and 24 of the beam extension 18 against the beam 17, relative pivotal movement of the plow beam 17 with respect to the plow beam extension 18 is effectively prohibited and, thus, the previously-mentioned bending moment stresses are unitarily resisted by the plow beam 17 and the plow beam extension 18.

It is to be observed that the central body 22 of the plow beam extension 18 is progressively divergently tapered from front to rear such that the body 22 is narrower (and of less cross sectional area) at the location of the line 3—3 of FIGURE 1 than at the location of line 4—4, and reaches a maximum width (and area) at the location of line 5—5, where the flanges 23 and 24 cease to exist as the plow beam extension consists solely of the enlarged central body 22.

The plow beam extension 18 may be appropriately bossed adjacent the aperture 35 (FIGURE 6) through which the major pivot bolt 36 passes as well as adjacent other bolt receiving apertures and has a downwardly and rearwardly open side recess or socket 38 disposed at the upper portion of a rear reinforcing rib 40. The specific function of the recess 38 will be described subsequently.

The vertically extending legs 43 and 45 of a pair of "L-shaped" brackets 42 and 44, preferably fabricated from angle iron, respectively abut the plow beam 17 on one side at surface 46 and the plow beam extension 18 on the opposite side at surface 48 at the laminated connection 19. This prevents relative lateral sway movement between the plow beam and the plow beam extension in response to the previously-mentioned torsional stresses.

The upper surfaces 50 and 52 of the generally horizontally extending legs 54 and 56 of the respective brackets 42 and 44 are adapted to receive a tool or stiffener bar (not shown) where a gang of plow bottoms are to be simultaneously drawn by a tractor.

A plurality of nut and bolt assemblies 20, 21 are used to hold the brackets 42 and 44, the rearward end of plow beam 17 and the forward end of the plow beam extension 18 as an integrated unit.

Plow beam extension 18 is rigid relative to the beam 17 and does not move relative to the beam 17 during release or tripping of the plow bottom 16 and the standard 14 from the working position (shown in solid lines in FIGURE 1) and to the idle position (shown fragmentarily in phantom lines 60 in FIGURE 1).

A pair of vertically extending parallel gusset side plates 70 and 72 are pivotally connected to the plow beam extension 18 at the major pivot bolt or pin 36, which pin passes through aligned apertures in each plate. The gusset plates 70 and 72 are laterally spaced from each other as depicted in FIGURE 2. The plates 70 and 72, which may be characterized as rotatable means (along with all structure carried by the gusset plates), are designed to rotate counterclockwise as shown in FIGURES 1, 6, 8 and 9 about the pivot bolt 36 when the plow bottom 16 is displaced from its ground-working position toward its idle position, as for example when the plow bottom strikes a substantially immovable earth-bound obstacle.

Additionally, the gusset plates 70 and 72 are rigidly fastened to the standard 14 by means of bolts 74 and 76 (FIGURE 1). Consequently, there is never any appreciable relative movement between the gusset plates 70 and 72 and the standard 14 or the plow bottom 16 during the previously-mentioned displacement toward the idle position.

The release mechanism 10 broadly includes a pair of external side latch links 80 and 82, a detent roller 84, a stop pin 86 carried by the gusset plates 70 and 72 within the space between the gusset plates, and an eccentric leaf spring column 90.

The two side latch links 80 and 82, are respectively positioned adjacent the exterior surfaces of the gusset plates 70 and 72, suitable spaces being provided therebetween, if desired. Latch links 80 and 82 are joined together by a bolt 94 and are also coupled by bolt 100 which rotatably supports detent roller 84 between links 80 and 82. The bolt 94 passes through an aperture 96 (FIGURE 2) in each side link 80 and 82 independently of the gusset plates 70 and 72. A pin 92 passes through a vertically elongate slot 98 in each side link 80 and 82 and also through a bore 99 in each gusset plate 70 and 72. Links 80 and 82 are pivotally supported upon plates 70, 72 by pin 92 and can shift in translation relative to plates 70, 72 by the amount permitted by slots 98.

Slots 98 accommodate limited relative upward translation of gusset plates 70 and 72 with respect to links 80 and 82 during the initial displacement of the plow toward its idle position.

The detent roller 84 is carried by bolt 100 which passes through an aperture 101 (FIGURE 2) in each latch link 80 and 82 as well as through a central bore in the detent roller 84, to rotatably carry the roller upon the shank of the bolt.

As best seen in FIGURE 2, roller 84 has a central cylindrical portion 102 of comparatively large diameter which is normally seated in socket recess 38 of beam extension 18 when the plow bottom is in its plowing position, as shown in FIGURE 1. The enlarged portion 102 is integrally flanked on each side by cylindrical portions 104 of smaller diameter. The smaller diameter of the portion 102 provides adequate clearance between the roller 84 and a clearance recess 106 in each of the gusset plates 70 and 72.

Detent roller 84 is normally constrained in the illustrated position of FIGURE 1 by a relatch spring 108, the ends of which are respectively secured at a block 110 and a pin 112 to tension relatch spring 108. The block 110 is integrally secured to the gusset plate 70, as by welding, and has an aperture (not shown) therein through which a short rod 114 passes. The rearward end of the rod 114 is equipped with an aperture (not visible) through which the adjacent end 115 of the spring 108 passes in the manner shown in FIGURE 1. The forward end of the rod 114 is threaded at 116 to receive a nut 118 and a lock nut 120.

The relatch pin 112 is integrally secured to the latch link 80, as by welding, to retain the end 122 of the spring in the illustrated position. Thus, the relatch spring 108, which is preferably of relatively low spring rate, tends to retain detent roller 84 in the socket 38. The spring 108 also tends to return the roller 84 to its abutting position against the recess 38, as shown in FIGURE 1, when the plow is being reset after being tripped to the idle position.

Eccentric column 90 comprises a vertically disposed, laterally deflectable leaf spring 130 of substantial unsupported length which is preferably fabricated from suitable high strength steel.

Eccentric column 90 is secured in the illustrated position of FIGURE 1 by a lower eye 136 and an upper eye 138, both integral with the leaf spring 130, which are respectively rotatably carried upon pin 92 and bolt 94. Suitable spacers may be used to separate the eyes 136 and 138 from the inside surfaces of the gusset plates 70 and 72. The leaf spring 130 is eccentrically offset from the axis 140 (passing between the centers of the bolts 92 and 94) by a selected eccentricity 142.

During no-load conditions, the central portion of the leaf spring 130 will be spaced a desired, predetermined distance 132 from the rear surface of the stop 86. During normal plowing operation, variations in draft applied to the plow oscillate gusset plates 70, 72 and cause leaf spring 130 to resiliently flex or buckle within the space 132, as pin 92 moves in slot 98 in response to oscillation of the plow.

If the plow bottom 16 strikes an essentially immovable obstacle, gusset plates 70, 72 pivot about the bolt 36 and pin 92 moves upwardly in the slot 98 to flex the spring 130 into contact with the stop pin 86. Further flexing of spring 130 after its central portion engages pin 86 biases the upper end of links 80, 82 in clockwise pivotal movement about pin 92, thereby resiliently biasing roller 84 out of recess 38.

Roller 84 is released from recess 38 by the biasing force applied by spring 130, and this biasing force comes into action only after spring 130 has been bowed enough to contact pin 86. When the central portion of spring 130 cannot move any further toward the left, as viewed in FIGURES 1 and 1a, the upper end of the spring must move to the right upon further upward movement of pin 92.

The geometrical relationship of pivot 36, pin 92, roller 84, and recess 38 is such that the normal forces applied by an overload to the plow tend to seat roller 84 more firmly in recess 38—i.e. an overcenter relationship exists when roller 84 is seated. The overcenter relationship is overcome by causing the overload forces to "squeeze" the opposite ends of spring 130 toward each other, thereby bowing the spring. The length of slot 98 and the initial spacing 132 between the spring and pin 86 are so related that the compressing of the ends of spring 130 upon the movement of pin 92 from its normal position to the upper end of slot 98 causes a bowed deflection of the central portion of the spring greater than spacing 132. After roller 84 moves out of recess 38, the plow bottom 16, the release mechanism 10 and the gusset plates 70 and 72 can pivot about the major pivot bolt 36 into the elevated idle position. Once the detent roller 84 is ejected from the socket 38, the leaf spring 130 will straighten out and the bolt 92 will return to a position adjacent the bottom of the slot 98.

Once the obstacle has been cleared, the plow bottom 16 is reset or returned to its working position automatically either by (1) raising the entire plowing implement causing the release mechanism to return by force of its own weight to its working position, or (2) reversing the implement direction of movement to pull the plow bottom back into its working position by reason of contact with the ground, as, for example, when using larger plows where the entire implement may not be conveniently raised.

The embodiment of FIGURE 6 is identical in all respects to the previously-described embodiment of FIGURES 1 and 2, and is correspondingly numbered, except that the eccentric column 90 of FIGURE 1, which is of fixed eccentricity, has been replaced in the FIGURE 6 embodiment by an eccentric column 150 of adjustable eccentricity.

The eccentric column 150 comprises a generally vertically extending, laterally deflectable leaf spring 152 secured in the illustrated position at the top and bottom ends by bolts 154 which each pass through an end aperture (not shown), in the spring 152. The single spring 152 may be replaced by a compound leaf spring comprising as many leaves as desired, a two leaf compound spring being illustrated in FIGURE 7.

The bolts 154 each rotatably pass through an aperture in projection 158 of an adjustable mounting block 156, one block being respectively rotatably mounted on the shanks of the bolts 92 and 94 at an aperture 160 (see FIGURES 6 and 7). Each block 156 also has a projecting shoe 162 with a generally horizontally extending surface 164 upon which the end or ends of the eccentric leaf spring or springs abut. A suitable number of shims 166 are disposed between the surface 168 of each mounting block projection 158 and the adjacent surface of the leaf spring, the bolt 154 first being loosened, the shims 166 being removed and the bolt re-tightened to adjustably vary the eccentricity of the leaf spring as desired.

With reference to FIGURE 7, a compound leaf spring 170 is used to replace the leaf spring 152 of FIGURE 6. The leaf spring 170 comprises a rear leaf 172 and a forward leaf 174, the leaves being separated one from the other by a separator 176, preferably of plastic or of bronze impregnated graphite. In order to enable the forward leaf 174 to assume an unrestricted elastic curve during the previously-described spring buckling or deflection, the leaf 174 is provided with a relatively large slot 178 into which a bushing 180 loosely fits. The bushing 180 is spaced from the edges of the slot 178 and is carried on the shank of the bolt 154. The bushing 180 functions to clamp against and restrain the rear leaf 172 to thereby retain the stack of shims 166 in the illustrated position.

The embodiment of FIGURE 8 is identical in all respects to the previously-defined embodiment of FIGURES 1 and 2 except that the eccentric column 90 of FIGURE 1 has been replaced by another eccentric column, generally designated 190. The eccentric column 190 comprises a leaf spring 192 which has a preformed camber of desired magnitude. Leaf spring 192 is formed with upper and lower integral eyes 194 and 196 which are rotatably supported upon pin 92 and bolt 94. The eccentricity of the leaf 192 may be effectively varied by varying the force exerted by a coiled compression spring 198 which at one end abuts the leaf at 200. The opposite end of the coil spring abuts a washer 202 at 204. The washer 202 in turn abuts against a nut 205 which is threadedly secured on a threaded end 206 of a central rod 208. The rod 208 passes centrally through the coiled spring 198 and is rotatably secured about the stop pin 86 by an eye 210, constituting the integral end of the rod 208.

As can be appreciated by inspection of FIGURE 8 and from the foregoing, the degree of compression exerted by the compression spring 198 may be varied by varying the location of the washer 204 along the threaded end 206 of the rod 208, the spring 198 functioning to both (1) vary the eccentricity of the leaf 192 within small limits and (2) as a relatch spring comparable to the function performed by the relatch spring 108 of FIGURES 1 and 2. Thus, the coiled spring 198 serves as a complete replacement for the relatch spring 108.

Referring now to FIGURES 9 and 10, two additional schemes for varying the maximum permissible distance through which the eccentric column may deflect are shown, i.e. (1) an adjustable stop generally designated 220, and (2) an adjustable eccentric column generally designated 230. All other structural components of the embodiments of FIGURES 9 and 10 are substantially identical to those previously described in conjunction with the embodiment of FIGURES 1 and 2, and are so numerically designated.

Adjustable stop 220 may be used in conjunction with an eccentric column having a fixed eccentricity and the adjustable eccentric column 230 may be used in conjunction with a fixed stop.

Adjustable stop 220 comprises a pin 222 rotatably carried by and extending between the previously described gusset plates 70 and 72. Pin 222 is a bolt with a lead external of one gusset plate to accommodate pivoting of the pin. The pin 222 is non-rotatably secured at 226 to an elongated bracket 224, which bracket integrally carries a stop pin 228 at the distal end thereof.

Thus, selective rotation of the pin 222 will correspondingly vary the position of the bracket 224 and the stop 228 with respect to the eccentric column 230 (contrast the dotted and solid positions of the bracket and the stop depicted in FIGURE 9). In this way the permissible distance 232 through which the column 230 may buckle or deflect may be varied.

The adjustable eccentric column 230 comprises a laterally deflectable leaf spring 234 having top and bottom transverse legs 236 and 238, respectively. The legs 236 and 238 each are provided with a pair of slots 240 (FIGURE 10). Clamping bolt assemblies pass through each slot 240 and a bore (not visible) in a projection 244 of an adjusting mounting block 246. The two blocks 246 are bored as at 248 to be rotatably mounted on the shanks of pin 92 and bolt 94.

The eccentricity of the leaf 234 may be conveniently varied by merely loosening the clamping bolts 242, shifting the leaf 234 in the desired direction (the slots 240 accommodating such shifting), and re-tightening the bolts 242.

Hence, the amount of force required to fully trip the plow bottom as previously described, may be varied with substantial precision.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a trip mechanism for an earth-working tool such as a plow or the like having a plow beam and a plow bottom assembly connected to said beam by a main pivot for pivotal movement relative to said beam between a normal earth-working position and an elevated idle position; a link mounted at one end upon a second pivot on said bottom assembly, roller means rotatably mounted on the other end of said link, means defining a concave detent recess in said beam for receiving said roller means in overcenter seated engagement when said plow bottom assembly is in said earth-working position, said link member being oriented to urge said roller means more firmly into said recess upon pivoting movement of said bottom assembly about said main pivot induced by earth-working load applied to said plow bottom, a leaf spring coupled at its opposite ends to said link and to said plow bottom assembly to be bowed in proportional response to earth-working load applied to said bottom assembly, and means operable upon a predetermined bowing of said spring to swing said link about said second pivot in a direction moving said roller means out of engagement with said recess.

2. In a trip mechanism as defined in claim 1, the further improvement wherein said means operable upon a predetermined bowing of said spring comprises a stop mounted upon said plow bottom assembly to be engaged by the central portion of said spring upon a predetermined bowing of said spring.

3. In a trip mechanism for an earth-working tool such as a plow or the like having a plow beam and a plow bottom connected to said beam by a main pivot for pivotal movement relative to said beam between a normal earth-working position and an elevated idle position; a second pivot mounted on said bottom in spaced relation to said main pivot, a link having an elongate slot at one end thereof slidably and pivotally receiving said second pivot to support said link upon said bottom for pivotal and translating movement relative to said bottom, roller means rotatably mounted on the other end of said link, means defining a concave recess in said beam for receiving said roller means in over-center seated engagement when said plow bottom is in said earth-working position, a leaf spring coupled at one end to said link and coupled at its other end to said second pivot to be bowed in proportional response to translatory movement of said bottom relative to said link induced by earth-working load applied to said bottom, and means operable upon a predetermined bowing of said spring to swing said link about said second pivot in a direction moving said roller means out of engagement with said recess.

4. In a trip mechanism as defined in claim 3; the further improvement wherein said leaf spring is mounted at said one end for pivotal movement about a third pivot located on said link, the central portion of said spring being offset a selected distance to one side of a plane containing the axes of said second and said third pivots whereby movement of said second pivot toward said third pivot causes the central portion of said spring to bow further to said one side of said plane, and said means operably comprises a stop pin mounted upon said bottom to be engaged by the central portion of said spring.

5. In a trip mechanism as defined in claim 4; means for adjusting the selected distance at which the central portion of said spring is offset from said plane.

6. In a trip mechanism as defined in claim 4; means for adjustably positioning said stop pin upon said plow bottom.

7. In a trip mechanism as defined in claim 4; spring means biasing the central portion of said leaf spring toward said stop pin.

8. In a break-back plow having a rigid support and a pair of gusset plates pivotally carried by the rigid support and from which a plow bottom depends, a release mechanism comprising an eccentric leaf spring column carried by a pair of side links normally in a generally vertically extending attitude to bias a detent roller carried by said side links against a socket recess in the rigid support, said side links being rotatably joined to the pair of side gusset plates by a common pivot pin which extends generally horizontally through a lost motion slot in each side link and through an aperture in each gusset plate, said common pivot pin accommodating relative pivotal movement between said side links and said gusset plates and said lost motion slot accommodating a limited amount of relative generally linear movement between the gusset plates and the side links to afford a yielding resistance to plow displacement caused by ground-engaging forces within a predetermined range, which yielding resistance tends to restore the plow bottom to its normal working position by retaining the detent roller within the socket recess and by inducing an elastic lateral buckling in the eccentric leaf spring column along its unsupported length an amount proportional to said resistance, a stop carried by the gusset plates against which the eccentric leaf spring column elastically laterally buckles when the ground-engaging force exceeds said range enabling the force to eject the detent roller from the socket recess thereby accommodating smooth essentially joint displacement of the plow bottom, the gusset plates, and the release mechanism, including the side links, to an elevated idle position.

References Cited

UNITED STATES PATENTS 3,125,167  3/1964  Mannheim et al. ____ 172—269
3,223,176  12/1965  Carra et al. _____ 172—265

ABRAHAM G. STONE, *Primary Examiner.*

J. R. OAKS, *Assistant Examiner.*